United States Patent [19]

Payne

[11] 3,967,956
[45] July 6, 1976

[54] SEPARATION OF NOBLE METALS
[75] Inventor: John Blunden Payne, London, England
[73] Assignee: Matthey Rustenburg Refiners (Proprietary) Limited, Johannesburg, South Africa
[22] Filed: Dec. 10, 1974
[21] Appl. No.: 531,369

[30] Foreign Application Priority Data
Dec. 13, 1973 United Kingdom............... 57796/73

[52] U.S. Cl............................... 75/101 BE; 75/121; 423/22
[51] Int. Cl.² ........................................ C22B 11/04
[58] Field of Search ........... 75/101 BE, 121; 423/22

[56] References Cited
UNITED STATES PATENTS

| | | | |
|---|---|---|---|
| 1,315,660 | 9/1919 | Ferguson | 423/22 |
| 3,437,431 | 4/1969 | Platz et al. | 423/22 |
| 3,484,235 | 12/1969 | Goss et al. | 75/121 |
| 3,575,687 | 4/1971 | Drobnick et al. | 75/101 BE X |
| 3,656,939 | 4/1972 | Boehm | 75/121 X |
| 3,725,047 | 4/1973 | Schneider | 75/121 X |
| 3,788,833 | 1/1974 | Short | 75/121 X |
| 3,848,048 | 11/1974 | Moore | 75/101 BE X |

FOREIGN PATENTS OR APPLICATIONS
640,577   7/1950   United Kingdom................ 423/22

*Primary Examiner*—G. Ozaki
*Attorney, Agent, or Firm*—Cushman, Darby & Cushman

[57] ABSTRACT

This invention relates to a process for the separation of palladium present in aqueous solutions which also contain the salts of one or more of the platinum group metals platinum, rhodium, ruthenium, osmium and iridium. According to one embodiment of the invention the process comprises the steps of:

a. adjusting, as necessary, the pH of the platinum group metal-containing solution to render the solution acidic;
b. contacting the so-obtained acidic solution with an oxime solvent; and
c. removing from contact with the acidic solution the organic phase containing substantially all of the palladium present in association with the oxime solvent.

36 Claims, No Drawings

SEPARATION OF NOBLE METALS

This invention relates to the separation and purification of the platinum group metals, and more particularly to the separation and purification of palladium present in aqueous solutions which also contain one or more of the salts of platinum, rhodium, ruthenium, osmium and iridium and the salts of base metals.

Solutions obtained in the recovery of mineral deposits of the platinum metals commonly contain ruthenium, osmium, rhodium, palladium, iridium and platinum and small quantities of base metals such as iron, copper, nickel, selenium, tellurium and antimony.

It is an object of the present invention to separate palladium from the above-mentioned base metals and also from the other platinum group metals present. It is a further object of the present invention to obtain palladium having a high degree of purity.

According to one aspect of the present invention a process for the separation and purification of the palladium which is present in platinum group metal-containing solutions comprises the following steps:

a. adjustment, if necessary, of the pH of the platinum group metal-containing solution to render it acidic;
b. contacting the so-obtained acidic solution with an oxime solvent; and
c. removing from contact with the acidic solution the organic phase containing substantially all of the palladium present in association wih the oxime solvent.

Adjustment of the pH at step (a) is preferably carried out by the addition of an aqueous solution of acid or alkali. We prefer to use dilute sodium hydroxide solution or dilute hydrochloric acid solution (according to the initial pH of the liquor) to give an acidity within the range 3N to pH4, preferably a pH of about 1.

Oxime solvents used in step (b) are preferably hydroxy oximes. Hydroxy oximes which are preferably used are these selected from the group comprising alpha hydroxy oximes of the general formula.

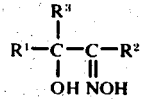

and orthohydroxyphenyloximes of the general formula:

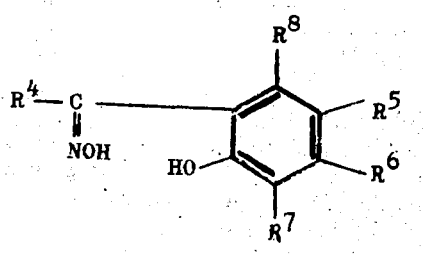

where $R^1$, $R^2$, $R^3$ and $R^4$ are the same or different and may be hydrogen, alkyl, aryl, aralkyl, alkaryl and substituted alkyl, aryl, aralkyl and alkaryl groups in which the substituent is inert to the palladium solvent extraction reaction conditions; $R^1$, $R^2$ and $R^4$ are preferably normal or iso alkyl groups within the range $C_1 - C_{12}$ (and more preferably $C_4 - C_{10}$) or aryl (preferably phenyl); $R^3$ is preferably hydrogen; $R^5$, $R^6$, $R^7$ and $R^8$ are preferably all hydrogen but may be normal or iso alkyl preferably within the range $C_1 - C_5$ and substituted normal or iso alkyl preferably within the range $C_1 - C^5$ in which the substituent is inert to the palladium solvent extraction reaction conditions.

Typical substituents which are inert to the palladium solvent extraction reaction conditions are halogen and nitro groups.

oxime solvents which we prefer to use are the LIX series of solvents LIX 64N, 70, 71 and 73 and solvent XI BA sold by the General Mills Corporation, Minneapolis, U.S.A. In the LIX series of solvents, which may conform to either of the general formulae for hydroxyoximes given above, $R^1$ and $^2$ may be both alkyl or both aryl or mixed alkyl and aryl. $R^3$ and $R^4$ in the LIX series are normally both alkyl (or hydrogen in the case of $R^4$) but can be aryl.

In Solvent XIBA, which is of the type given by the first general formula given above, $R^1$ and $R^2$ are normal alkyl lying within the range $C_4 - C_{10}$.

Alternative oxime solvents which can be used are RD 529 manufactured by Shell Chemicals and ACORGA PI and ACORGA P17 (Registered Trade Marks) supplied by Imperial Chemical Industries Ltd.

RD 529 is an hydroxyoxime solvent having the formula:

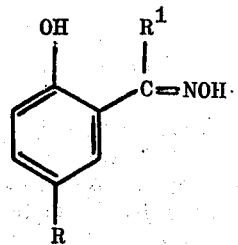

in which R and $R^1$ are alkyl groups. ACORGA PI is also an orthohydroxyaryloxime.

After step (c) the palladium is preferably stripped from the oxime solvent by the use of a relatively strong acidic solution having a strength within the range 3N – 12N. Suitable acids which may be used are aqueous solutions of sulphuric acid, perchloric acid, hydrochloric acid or nitric acid.

According to a second aspect of the present invention a process for the separation and purification of the palladium which is present in platinum group metal-containing solutions comprises the following steps:

a. acidifying the platinum group metal-containing solution to give a pH within the range 0.5 – 4;
b. contacting, by means of a solvent extraction technique, the acidified solution with hydroxy oxime solvent RCH(OH)C(NOH)R in which R is alkyl
c. removing from contact with the acidified solution the organic phase containing substantially all of the palladium present in association with the oxime solvent; and
d. stripping the palladium, in the form of one or more complex anions, from the organic phase containing the said oxime solvent by the use of a strongly acidic solution.

The acidic solution used at step (d) is preferably one having a strength within the range 3N – 12N. Suitable acids which may be used are aqueous solutions of sulphuric acid, perchloric acid, hydrochloric acid or nitric acid.

Known techniques may be used for ensuring adequate contact of the hydroxy oxime solvent with the acidic solution as described in step (b) above (in both aspects of the invention). If the operation is being carried out on a large scale, a multi-stage counter-current extraction assembly may be used. Alternatively the two phases may be vigorously agitated together by shaking, stirring etc.

At step (c) above (in both aspects of the invention) the organic phase containing substantially all of the palladium present in association with the oxime solvent used in step (b) is normally removed by physical methods as the phase separation is quite distinct.

The invention also includes palladium obtained using the process of the invention.

The present invention lends itself to operation in a single multi-stage counter-current extraction assembly and accordingly a further feature of the invention includes the use of a counter-current extraction assembly for the separation of palladium from aqueous solutions of one or more of the platinum group metals rhodium, platinum, ruthenium, osmium, iridium, palladium and base metals as described above.

The oxime solvent which we prefer to use is a water insoluble straight chain saturated hydroxy oxime $$\underset{\underset{OH}{|}}{R^1CH}-\underset{\underset{NOH}{||}}{C\,R^2}$$

in which the alkyl groups $R^1$ and $R^2$ are conveniently identical and lie within the range $C_1 - C_{12}$ and preferably $C_4 - C_{10}$. Such a product is sold under the name X1 - 8A by the General Mills Corporation, Minneapolis, U.S.A. We prefer to use a 10% solution of this solvent in an aromatic or aliphatic hydrocarbon diluent. The one we prefer to use is Solvesso 150 (Registered Trade Mark) which is an aromatic hydrocarbon solvent sold by Esso Chemicals Ltd. The strength of X1 - 8A in the hydrocarbon xolvent (diluent) may conveniently range from 5 to 25%.

Preferably, the palladium is recovered from the acid stripping solution using an anion exchange method and we have found that one very suitable technique is to pass the palladium-containing solution through an anion exchange column. Palladium may then be eluted from the column by the use of an ammonia/ammonium chloride solution. The palladium leaves the column as the tetrammine ion $Pd(NH_3)_4^{2+}$. The tetrammine solution is then acidified with hydrochloric acid to produce $Pd(NH_3)_2Cl_2$ which is an insoluble yellow salt.

Pure palladium may be obtained from the insoluble salt $Pd(NH_3)_2Cl_2$ by reduction. Suitable reductants are ethylene, formaldehyde, oxalate, formate, hydrazine and hydrogen under pressure. An alternative method of reduction to the metal is cationation of the solid followed by reduction with hydrogen.

By the use of this technique, of the platinum group metals present, only palladium with a very small quantity of platinum is extracted into the oxime solvent and none of the base metals are exchanged onto the anion exchange resin. The invention, therefore, offers a route by which palladium may not only be separated from other platinum group metals and base metals, but also by which palladium having high degree of purity may be obtained.

The anion exchange resin which we prefer to use is a strongly basic anion resin which converts to the chloride form, when stripped of palladium.

Feed solutions can vary greatly in concentrations of platinum metals. The Example described below gives results obtained with a typical feed solution.

EXAMPLE

A feed solution containing a total of 35 g/l of the six platinum group metals Pt, Pd, Rh, Ru, Os and Ir at pH 1, having the following composition, was used:

|  | grams/liter |
|---|---|
| Pt | 16.4 |
| Pd | 11.05 |
| Rh | 3.2 |
| Ru | 3.6 |
| Os | 0.01 |
| Ir | 0.7 |
| Base metals | 1.5 |

This solution was batch-extracted twice with diluted hydroxyoxime solvent X1 - 8A. The first extraction with a 2:1 organic to aqueous ratio and 750 ml of feed solution removed more than 98% of the palladium. The second extraction removed the remaining palladium down to a level below the limit of detection.

Strong hydrochloric acid solution was then used to strip the palladium from the organic solvent-containing phase.

Palladium was removed from the strip liquor by passage down a column of Deacidite FF (Registered Trade Mark, The Permutit Co. Ltd.) anion exchange resin and the palladium-free acid returned to the strip cycle.

Palladium was eluted from the resin as the tetrammine with a solution containing 7.5% ammonia and 5% ammonium chloride. With slow elution, a tenfold concentration of the palladium was achieved in this elution step.

Palladium diammine dichloride was recovered from the eluate by acidification with hydrochloric acid.

The throughput of feed solution was 600 ml an hour and the trial was run intermittently for 2 weeks. In all, about 7 oz. Troy of palladium was recovered from the eluate. Samples of the precipitated diammine contained less than 0.01% of platinum on the palladium content, with rhodium and iridium not detected. The following percentage recovery and purity were obtained without any further refining steps, namely,

| Pd recovery: | 98.0% |
|---|---|
| Pd purity: | 99.9%. |

What we claim is:

1. A process for the separation and purification of palladium which is present in a solution with at least one other platinum group metal, said process comprising the steps of:
   a. adjusting, as necessary, the pH of the solution to render the solution acidic;
   b. contacting the so-obtained acidic solution with an oxime solvent; and
   c. removing from contact with the acidic solution the organic phase containing substantially all of the palladium present in association with the oxime solvent.

2. A process according to claim 1 in which the oxime solvent is an hydroxy oxime solvent.

3. A process according to claim 2 in which the hydroxyoxime is selected from the group consisting of alpha hydroxy oximes of the general formula:

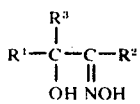

and ortho hydroxy phenyloximes of the general formula:

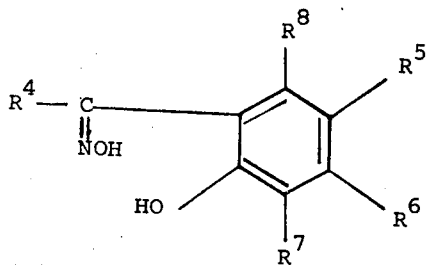

where:
a. $R^1$, $R^2$, $R^3$ and $R^4$ may be the same or different and are selected from the group consisting of hydrogen, unsubstituted alkyl, aryl and aralkyl, and substituted alkyl, aryl, aralkyl and alkaryl in which the substituent is inert to the palladium solvent extraction reaction conditions; and
b. $R^5$, $R^6$, $R^7$ and $R^8$ may be the same or different and are selected from the group consisting of unsubstituted normal or iso alkyl, and substituted normal or iso alkyl in which the substituent is inert to the palladium solvent extraction reaction conditions.

4. A process according to claim 3 in which $R^1$ and $R^2$ are alkyl groups and $R^3$ is hydrogen.

5. A process according to claim 4 in which $R^1$ and $R^2$ are alkyl groups within the range $C_1 - C_{12}$.

6. A process according to claim 4 in which $R^1$ and $R^2$ are alkyl groups within the range $C_4 - C_{10}$.

7. A process according to claim 3 in which at least one of the groups $R^1$ and $R^2$ is an aryl group.

8. A process according to claim 7 in which $R^1$ is an alkyl group and $R^2$ is an aryl group.

9. A process according to claim 7 in which $R^1$ is an aryl group and $R^2$ is an alkyl group.

10. A process according to claim 7 in which both $R^1$ and $R^2$ are aryl.

11. A process according to claim 10 in which both aryl groups are phenyl.

12. A process according to claim 10 in which $R^3$ is hydrogen.

13. A process according to claim 7 in which the aryl group is phenyl.

14. A process according to claim 7 in which $R^3$ is hydrogen.

15. A process according to claim 3 in which $R^4$ is an unsubstituted alkyl group or substituted alkyl group and $R^5$, $R^6$, $R^7$ and $R^8$ are hydrogen.

16. A process according to claim 3 in which $R^5$, $R^6$, $R^7$ and $R^8$ are the same or different unsubstituted normal or iso alkyl groups within the range $C_1 - C_5$.

17. A process according to claim 3 in which $R^5$, $R^6$, $R^7$ and $R^8$ are the same or different substituted normal or iso alkyl groups within the range $C_1 - C_5$.

18. A process according to claim 3 in which $R^4$ and $R^5$ are unsubstituted alkyl groups or substituted alkyl groups and $R^6$, $R^7$ and $R^8$ are hydrogen.

19. A process according to claim 18 in which $R^4$ is an unsubstituted alkyl or substituted alkyl group within the range $C_1 - C_{12}$ and $R^5$ is an alkyl group or substituted alkyl within the range $C_1 - C_5$.

20. A process according to claim 19 in which an alkyl group substituent is selected from the group consisting of halogen and nitro groups.

21. A process according to claim 3 in which $R^4$ is an aryl group and $R^5$ is an unsubstituted alkyl or substituted alkyl group.

22. A process according to claim 21 in which the aryl group is phenyl and in which the unsubstituted alkyl or substituted alkyl group is within the range $C_1 - C_5$.

23. A process according to claim 1 in which the platinum group metal-containing solution is acidified at step (a) with hydrochloric acid to give an acid strength within the range 3N to pH 4.

24. A process according to claim 23 in which the acid strength is at a pH of about 1.

25. A process according to claim 1 in which the organic phase removed at step (c) is stripped of its palladium with an acid.

26. A process according to claim 25 in which the acid is a strong aqueous solution of an acid selected from the group consisting of sulphuric acid, hydrochloric acid, nitric acid and perchloric acid.

27. A process according to claim 26 in which the acid strength is within the range 3N – 12N.

28. A process according to claim 25 in which palladium is removed from the acid stripping solution by passage through an ion-exchange resin.

29. A process according to claim 28 in which the ion-exchange resin is a basic anion exchange resin.

30. A process according to claim 29 in which the palladium is eluted from the resin with a solution containing $NH_4OH$.

31. A process according to claim 30 in which the solution also contains $NH_4Cl$.

32. A process according to claim 30 in which the eluate is acidified with hydrochloric acid.

33. A process in which the compound $Pd(NH_3)_2Cl_2$ obtained by a process according to claim 32, is reduced to the metal.

34. A process according to claim 33 in which the reducing agent is selected from the group consisting of ethylene, formaldehyde, oxalate, formate, hydrazine and hydrogen under pressure.

35. A process for the separation and purification of the palladium which is present in the platinum group metal-containing solutions which comprises the steps of:
a. acidifying the platinum group metal-containing solution (if necessary) to give a pH within the range of 0.5-5;
b. contacting, by means of a solvent extraction technique, the acidic solution with an hydroxy oxime solvent RCH(OH)C(NOH)R in which R is alkyl;
c. removing from contact with the acidic solution the organic phase containing substantially all of the palladium present in association with the oxime solvent; and
d. stripping the palladium, in the form of one or more complex anions, from the organic phase containing the said oxime solvent by the use of a strongly acidic solution.

36. A process according to claim 35 when carried out in a multi-stage counter-current solvent extraction apparatus.

* * * * *